Patented Sept. 10, 1929.

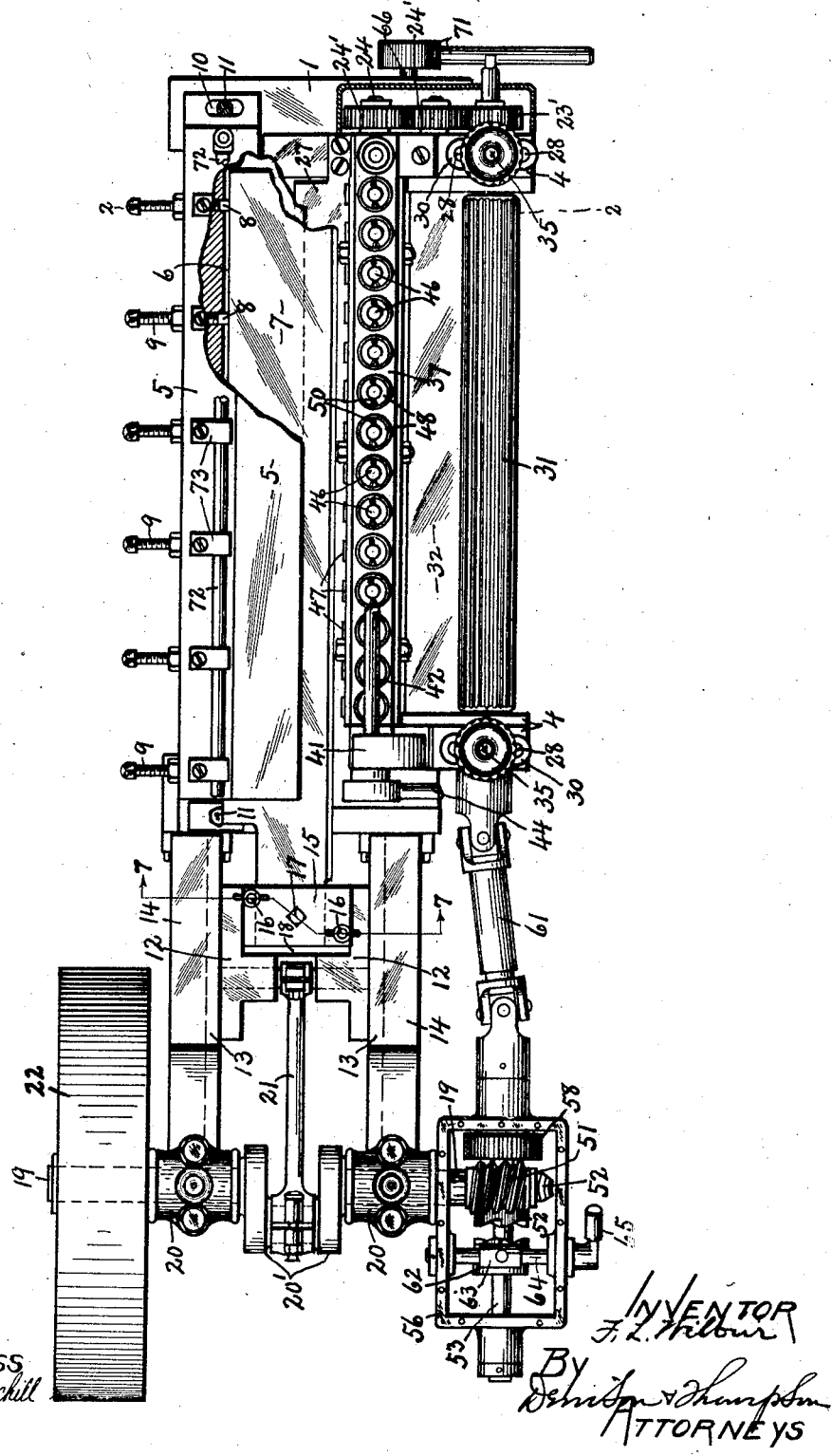

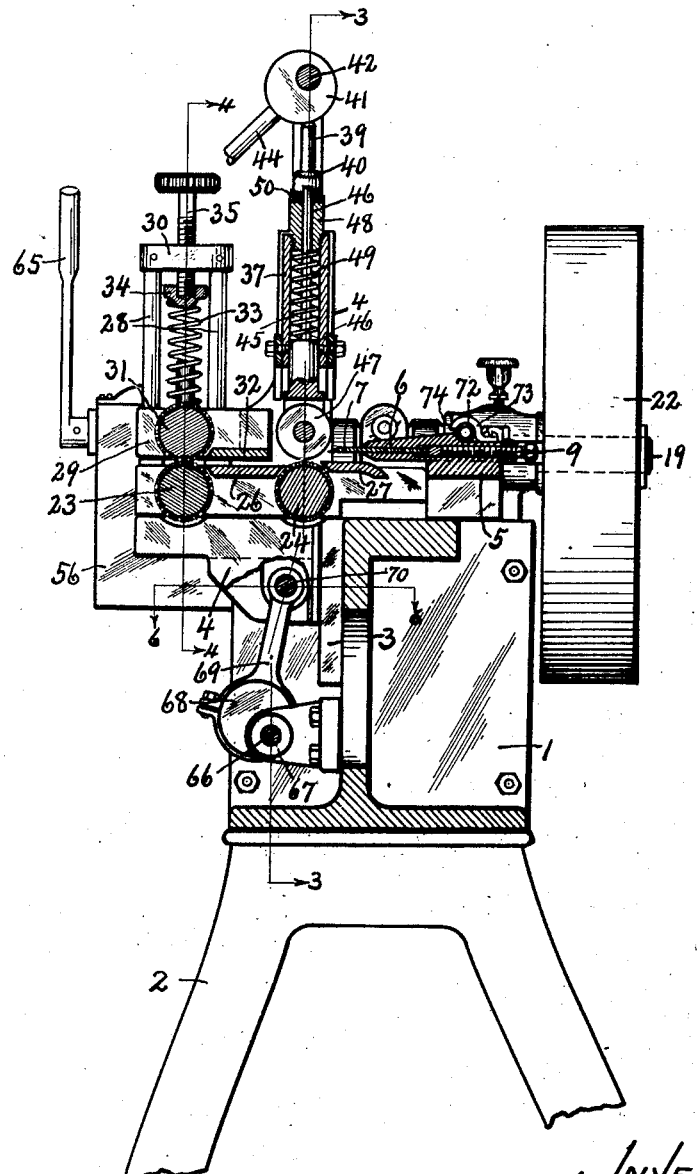

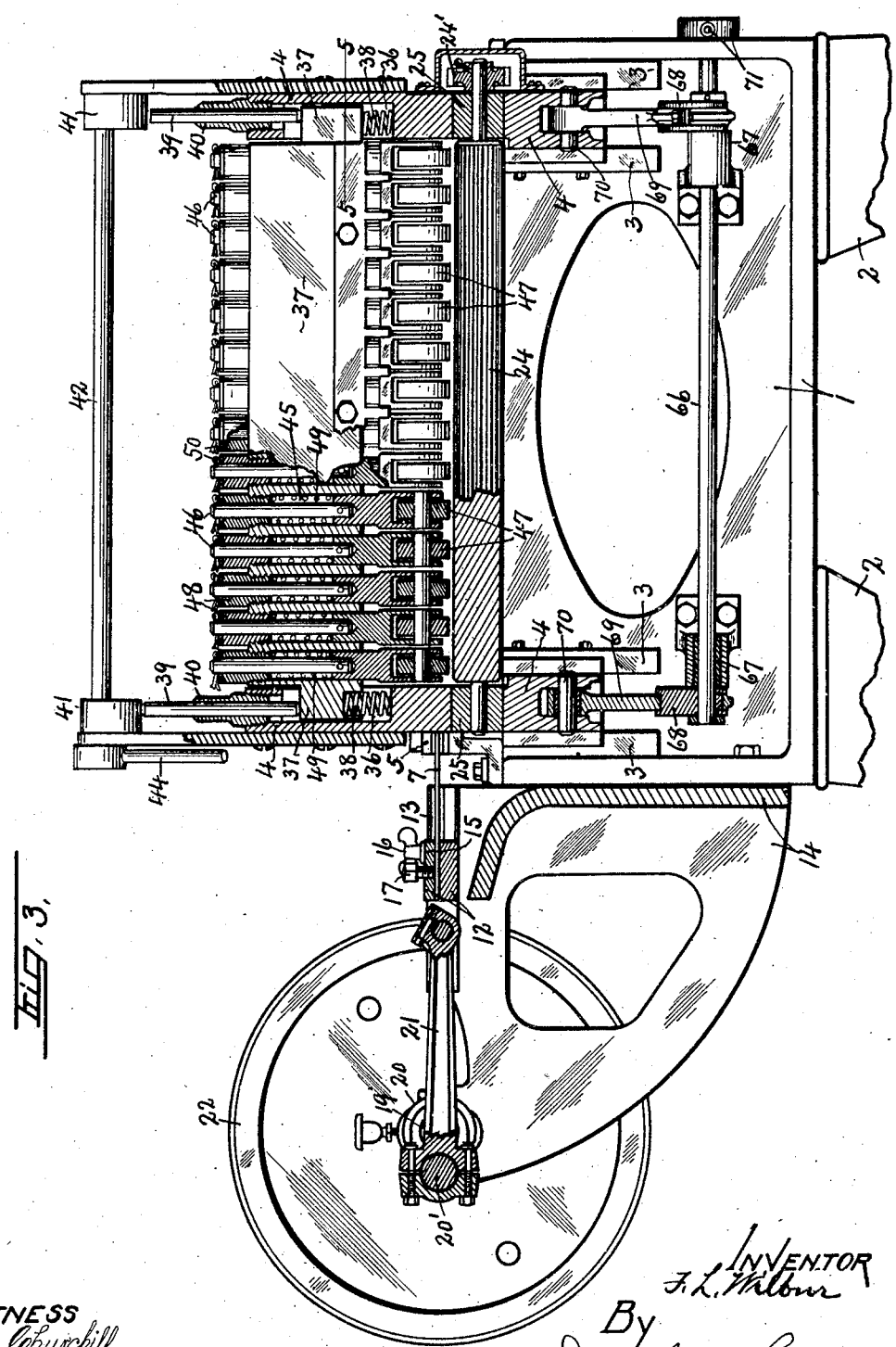

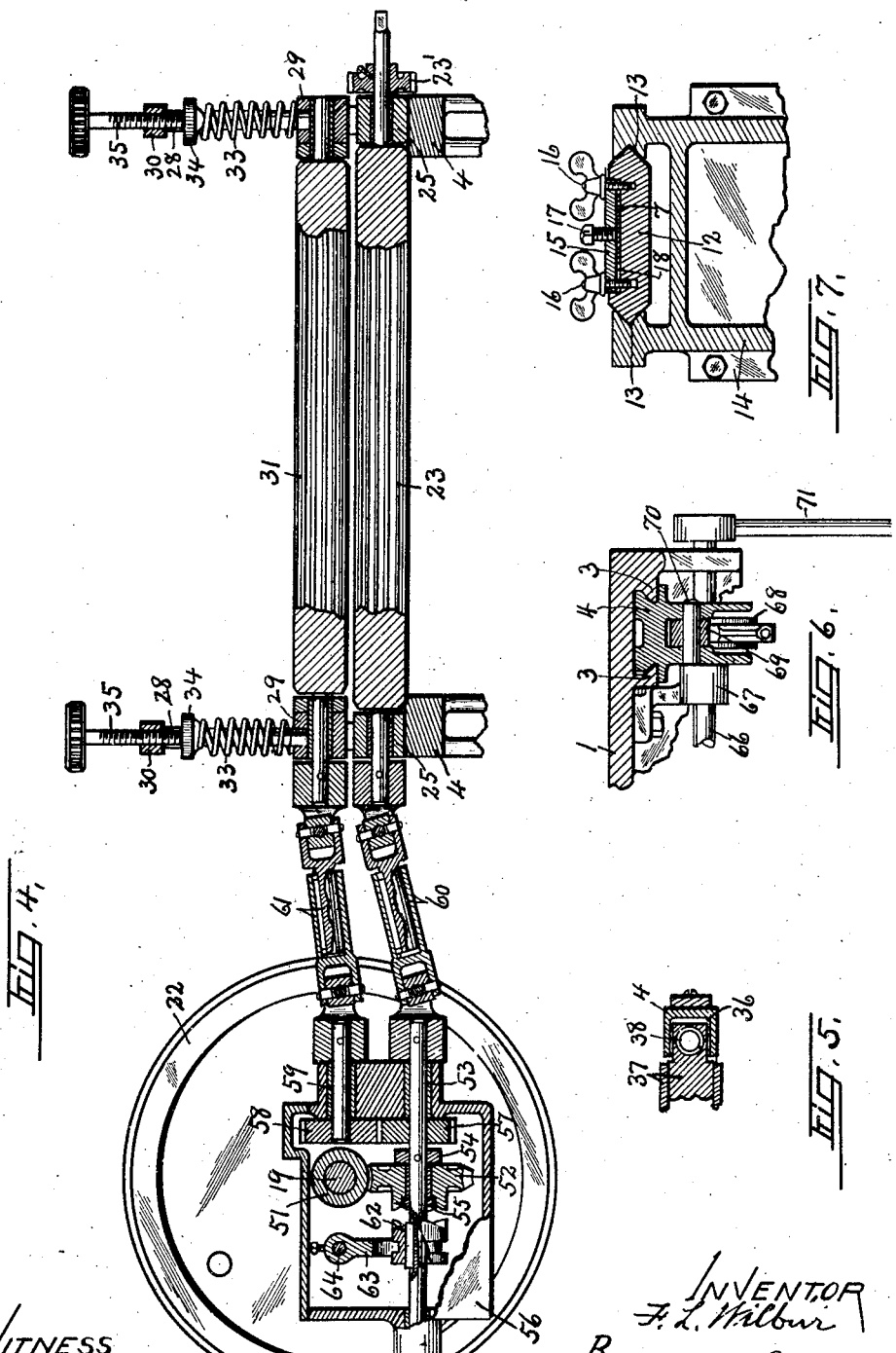

1,727,683

UNITED STATES PATENT OFFICE.

FRANK LA VERNE WILBUR, OF BINGHAMTON, NEW YORK.

SKIVING MACHINE.

Application filed April 9, 1927. Serial No. 182,439.

This invention relates to a skiving machine for splitting old or used rubber tire shoes and the like preparatory to the manufacture of one or both of the divided parts into other articles of manufacture such as tire patches in which it is desired to retain the corded or other fabric with the vulcanized rubber incorporated therein so as to give the desired strength to the patches or supplemental linings for use as reinforcements for weakened parts of other tire shoes or casings to extend the life thereof.

These old or dis-used casings which have become unfit for further use as such vary materially in thickness transversely from edge to edge and also circumferentially and the main object of the present invention is to provide means whereby the shoes or casings after being severed transversely by one or more cuts may be automatically fed into engagement with a longitudinally reciprocating skiving blade in such manner that the outer rubber surfacing may be speedily removed close to the fabric and a definite distance from the inner surface thereof so as to form a rubberized fabric sheet of substantially uniform thickness capable of being cut into various sizes and shapes for reuse as reinforcing patches or linings for the weakened portions of pneumatic tires to prolong the use thereof.

Another object is to provide means whereby various portions of the casing section or sections of different thicknesses may be held with uniform pressure flatwise against the underlying feeding roll adjacent the cutting edge of the skiving blade so as to assure uniform thickness of the finished sheet.

Another object is to provide means whereby the feeding and pressure rollers may be adjusted transversely of the plane of the skiving blade for varying the thickness of the finished product according to the size and nature of the shoe or casing.

A further object is to provide means for adjusting the skiver blade toward and from the adjacent feeding and pressure rollers to compensate for wear of the cutting edge of the blade.

Other objects and uses relating to specific parts of the machine will be brought out in the following description.

In the drawings:—

Figure 1 is a top plan, partly broken away, of a machine embodying the various features of my invention.

Figure 2 is a transverse vertical sectional view taken in the plane of line 2—2, Figure 1.

Figures 3 and 4 are longitudinal vertical sectional views taken in the planes of lines 3—3 and 4—4, Figure 2.

Figure 5 is an enlarged detail horizontal sectional view taken in the plane of line 5—5, Figure 3.

Figure 6 is an enlarged detail horizontal sectional view taken in the plane of line 6—6, Figure 2.

Figure 7 is a detail transverse vertical sectional view taken in the plane of line 7—7, Figure 1.

As illustrated, this machine comprises a horizontal main supporting frame —1— adapted to be mounted upon legs —2— or other suitable supporting means and provided near the opposite ends of its front side with upright parallel ways —3— for receiving and supporting a pair of vertically adjustable end heads —4— carrying the feeding and pressure mechanisms and other movable parts of the machine hereinafter described.

A lengthwise guide bar —5— is mounted upon the upper face of the frame —1— for transverse adjustment relatively thereto and is provided with a lengthwise slot or guideway —6— open along its front edge for receiving and guiding a longitudinally reciprocating skiving blade or knife —7— having its front cutting edge projecting some distance beyond the corresponding edge of the bar —5— adjacent the feeding means, presently described.

The rear edge of the blade —7— is engaged with a series of back rests or blocks —8— arranged in longitudinally spaced relation in suitable recesses in the rear wall of the slot —6—, said blocks being engaged by a corresponding number of adjusting screws —9— by which the blade may be adjusted toward the feeding mechanism to compensate for wear.

The bar is also adjustable toward and from the feeding mechanism and for this purpose its opposite ends are provided with transverse slots —10— for receiving clamping bolts —11— which are engaged in threaded apertures in the underlying portions of the frame —1— and are adapted to be tightened to hold the bar —5— in place when adjusted to bring the blade into the desired relation to the feeding mechanism.

The back rests —8— serve to hold the blade —7— against rearward pressure upon the cutting edge thereof produced by the feeding of the work rearwardly against said cutting edge, the bar —5— being sufficiently stiff and rigid to resist springing of any portion of the blade while the slot —6— is of just sufficient vertical depth to permit free longitudinal movement of the blade and to prevent vertical movement thereof thus causing all portions of the blade to travel in the same horizontal plane parallel with the axis of the feeding rolls, presently described.

One end of the blade —7— (in this instance the left hand end, Figure 1) is secured by suitable clamping and releasing means to a longitudinally reciprocating cross head —12— which is guided in parallel horizontal ways —13— on a bracket —14—, the latter being bolted or otherwise secured to the corresponding end of the frame —1—, Figures 1 and 3.

The cross head —12—, Figure 7, is provided with a recess in its upper side for receiving the adjacent end of the blade —7— and a suitable clamping plate —15— which engages the upper face of the adjacent end of the blade —7— and is firmly clamped to the cross head by means of clamping bolts —16— to firmly hold the blade in operative connection with the cross head, said blade being additionally held in place by a separate set screw —17— engaged in a threaded aperture —15— and also engaging the upper face of the end of the blade —7—.

The transverse width of the recess as —18— in the upper face of the cross head —12— between the clamping bolts —16— is somewhat greater than the corresponding width of the adjacent portion of the blade —7— to allow for the transverse adjustment of said blade by the screws —9— relatively to the bar —5— as previously explained.

Aside from the connection of one end of the blade with the cross head or carriage —12—, said blade is free from attachment to other parts of the machine so as to play freely in the guide slot —6—, said blade being relatively thin and flat, but is held against buckling by the rigid lower and upper walls of the slot against which the corresponding faces of the blade are adapted to slide.

*Carriage reciprocating means.*

A crank shaft —19— is journaled in suitable bearings —20— on the outer end of the bracket —14— to extend transversely and horizontally relatively to the guide-ways —13— and is provided with a crank or eccentric —20'— connected by a pitman or connecting rod —21— to the central portion of the cross head —12— for reciprocating the blade endwise in its guide-way —6—.

This shaft —19— has a pulley —22— adapted to be connected by a belt to any available source of power, not shown.

*Work-feeding means.*

A pair of similar circumferentially corrugated feed rollers —23— and —24— are journaled at their end in bearings —25— on the vertically adjustable end heads —4— to extend lengthwise of the machine in parallel transversely spaced relation and in a horizontal plane below the plane of reciprocation of the skiving blade —7—.

These feeding rollers —23— and —24— are each adjustable vertically by the vertical adjustment of the heads —4— upon which they are mounted to vary the distance between the horizontal plane of the upper faces of the roller and the horizontal plane of the blade —7— and thereby to vary the thickness of the finished product following the skiving operation thereon.

The heads —4— are connected by work-supporting table sections —26— and —27—, Figure 2, having their upper faces disposed at about the same level as the upper faces of the feed rollers —23— and —24— for supporting and guiding the work in a horizontal plane to the skiving blade —7—, the table section —26— being disposed between the feed rollers —23— and —24— while the other table section —27—extends rearwardly from the upper face of the roller —24— directly beneath the cutting edge of the blade —7— but in spaced relation thereto according to the thickness of the work required.

Separate pairs of guide rods —28— are secured at their lower ends to the opposite end head —4— to extend upwardly therefrom in parallel spaced relation for receiving and guiding vertically movable bearings —29—, the upper ends of the guide rods of each pair being connected by a tie bar —30—, Figures 2 and 4.

A circumferentially corrugated feed roller —31—similar to the feed roller —23— has its opposite ends journaled in the vertically movable bearings —29— parallel with and directly over the feed rollers —23— for cooperation therewith as the initial means for feeding the work into the machine.

These bearing members —29— are provided with rearward extensions connected by a guide plate —32— in a plane nearly coincident with the lower face of the roller —31— and directly over the intermediate bearing plate —26— to cooperate therewith for guiding the work to the read feed roller —24— and thence to the cutter blade —7—.

Suitable coiled springs —33— are interposed between the upper faces of the bearings —29— and adjustable blocks —34— between the upright guide rods —28— of each pair for yieldingly holding the upper feed roll —31— in feeding relation to the lower feeding roll —23— and also to permit the upper feeding roll to automatically adjust itself to varying thicknesses of the work operated upon as it is fed into the machine and at the same time to maintain sufficient pressure upon the work to cause the latter to be positively fed to the cutter blade —7—.

A pair of hand screws —35— are engaged in threaded apertures in the tie bars —30— and connected to the underlying blocks —34— for varying the tension of the springs —33— as may be desired.

The inner sides of the upper ends of the end heads —4— are provided with recesses —36— forming vertical guides for receiving and guiding the opposite reduced ends of a vertically movable pressure bar —37—, Figures 1, 2 and 3, said reduced ends being yieldingly supported on the upper ends of a pair of coiled springs —38— having their lower ends resting upon the lower walls of the recesses —36—, Figure 3.

A pair of pressure rods —39— are guided in bushings —40— in the upper ends of the heads —40— and have their lower ends engaged with the upper faces of the reduced ends of the pressure bar —37— and their upper ends engaged with overlying cams —41— on the opposite ends of a lengthwise shaft —42—, Figure 3, one end of the shaft being provided with a handle —44— by which the shaft —42— with the cams —41— thereon may be rotated to adjust the pressure bar —37— downwardly against the action of the springs —38— as may be desired according to the thickness of the work operated upon.

The bar —37— is supported some distance above and in the vertical plane of the lower feed roller —24— and is provided with a series of vertical guide openings —45— arranged in uniformly spaced relation lengthwise thereof for receiving and guiding a corresponding number of vertically movable plungers —46— carrying at their lower ends a similar number of pressure rollers —47—, Figures 2 and 3, and having their upper ends reduced and guided in suitable bushings —48— in the upper ends of the several vertical openings.

Separate coiled springs —49— are interposed between the enlarged lower ends of the plungers —46— and the lower end of the bushings —48— for yieldingly holding the plungers with the rollers thereon in their pressing positions and allowing each plunger with its roller to move vertically independently of the others so as to conform to varying contours and thicknesses of the material operated upon throughout the length of the feed rollers —23— and —24—.

The plungers —46— are held against undue downward movement by cotter pins or keys —50— which are passed through apertures in the upper ends thereof and engaged with the upper ends of the bushings —48— as shown in Figure 3 so that the lower faces of the pressure rollers —47— will be normally disposed in substantially the same horizontal plane.

These plungers —46— with the pressure rollers —47— thereon are arranged in a straight line parallel with and directly over the underlying feed roller —24— and serve to yieldingly hold the work in engagement with the lower feed roller directly in front of the cutting edge of the blade so as to assist the rollers —23— and —31— in effecting a positive feed of the work to the cutter.

*Operating means for feed rollers.*

The main driving shaft —19— is extended axially beyond the vertical plane of the axis of the upper feed roller —31— and in approximately the same horizontal plane thereof and is provided with a worm —51— meshing with a worm gear —52— which is loosely mounted upon a lengthwise shaft —53— but is held against axial movement thereon by end collars —54— and —55—, Figure 4.

This shaft —53— is journaled in suitable bearings in the opposite ends of a gear case —56— which in turn is secured to the front side of the outer end of the bracket —14— for inclosing the gears and clutch by which rotary motion is transmitted from the main driving shaft to the upper feed roller —31—.

A spur gear —57— is secured to the shaft —53— to rotate therewith and meshes with a companion spur gear —58— on a superposed shaft —59— which is also journaled in the inner end of the gear case —56— as shown in Figure 4.

The lower shaft —53— is connected by a flexible shaft —60— to the adjacent end of the lower feed roller —23— while the upper shaft —59— is connected by a similar flexible shaft —61— to the adjacent end of the upper feed roller —31—, the purpose of the flexible shafts being to permit vertical adjustment of the rollers —23— and —31— without disturbing the fixed position of the gear case —56— and gears contained therein.

The worm gear —52— is provided on its outer end with a clutch face adapted to cooperate with a clutch member —62— which is splined on the shaft —53— for axial movement into and out of engagement with the clutch face of the worm gear —52— as shown in Figure 4.

This clutch member —62— is provided with an annular groove engaged by a shifting lever or crank arm —63— which is secured to an operating spindle —64—, the latter being journaled in suitable bearings in the front and rear sides of the gear case —56— and provided with an external handle —65— by which it may be rotated or rocked to move the clutch member —62— into and out of clutching engagement with the worm gear —52— and thereby to control the rotation of the counter-shaft —53—.

Rotating motion is transmitted from the lower front feed roll —23— to the lower rear feed roll —24— by intermeshing spur gears —23'—, —24'— and —24''—, the gears —23'— and —24'— being secured to their respective feed rolls —23— and —24— while the other gear —24''— is an idler journaled on a suitable bearing on the frame —1—. Figure 1.

Head-adjusting means.

The means for adjusting the heads —4— and parts carried thereby vertically along the guide-way —3— comprises, in this instance, a shaft —66— journaled in suitable bearings —67— on the main supporting frame —1— and provided with a pair of eccentrics —68— for receiving and supporting the lower ends of a pair of pitmen or connecting rods —69— having their upper ends connected by pivotal pins —70— to the lower ends of the heads —4— as shown more clearly in Figures 2 and 3, the outer end of the shaft —66— being provided with a handle —71— by which it may be rotated.

Cooling means.

A water pipe —72—, Figures 1, and 2, is secured by clips —73— to the top of the bar —5— lengthwise thereof in a plane above and at the rear of the blade —7— and is provided with discharge orifices —74— facing the cutting edge of the blade for discharging water thereon for cooling purposes and also to facilitate the cutting of the rubber material.

Operation.

The old or used rubber tires to be skived or reduced to even thickness for manufacture into tire reinforcing patches or linings is first cut transversely into one or more sections after which one end thereof is spread out as nearly flatwise as possible by hand and fed between the first set of rollers —23— and —31— which immediately grip and flatten out the shoe and feed it rearwardly between the plates —26— and —32— and thence between the rear feed roller —24— and overlying pressure rollers —47— from which it is fed across the upper face of the table —27— against the cutting edge of the skiving knife —7—.

During this feeding operation the skiving knife is reciprocated endwise against and transversely of the shoe to separate the greater portion of the rubber tread from the rubberized fabric portion which latter is deflected rearwardly and downwardly from the rear end of the table section —7— to be subsequently cut into reinforcing patches or other products while the remaining rubber is deflected upwardly to the rear of the machine and may be reclaimed in the manufacture of tires or other rubber articles.

Under these conditions the main product which it is desired to use for reinforcement linings or patches will be of substantially uniform thickness according to the amount of separation between the knife —7— and underlying plate —27—.

This thickness may, however, be varied by the vertical adjustment of the heads —4— through the medium of the eccentrics —68— and pitmen —69—.

While the material is being fed between the feeding rollers the upper feed roll —31— is free to yield vertically to conform to varying thicknesses of the work and also to assure the pressing of the inner face of the shoe flatwise against the lower face of the feed roll —23—, the degree of pressure being regulated by the adjustment of the springs —28—.

In a similar manner the pressure rollers —47— serve to hold all portions of the inner face of the tire shoe flatwise against the lower feed roller —24— by reason of the independent adjustments of the several pressure rollers —47—.

It is evident, however, that the entire set of pressure rollers may be adjusted vertically by the adjustment of the bar —37— through the medium of the cams —41— and pressure rods —39— while the action of the springs —38— which tend to lift the bar —37— when the pressure rods —39— are more or less released.

What I claim is:—

1. In a machine for skiving the rubber treads from pneumatic tire shoes or casings after the latter have been divided transversely, a horizontally disposed knife blade, means for reciprocating the blade endwise, a feed roller in a plane below and parallel with the blade and adjacent the cutting edge thereof, means for rotating the roller to feed the shoe against the cutting edge of the blade, a pressure bar directly over the feeding roller, separately movable plungers guided on the bar and each spring-pressed toward the feed roller, and pressure rollers carried by said plungers for pressing the shoe against the roller.

2. A skiving machine as in claim 1 in which means is provided for adjusting the pressure bar vertically to vary the pressure of the pressure-rollers upon the work.

3. A skiving machine as in claim 1 in which separate devices are provided for respectively adjusting the feed roller and bar vertically.

4. A skiving machine as in claim 1 in which means is provided for spreading the shoe in a substantially flat plane as it enters between the feed roller and pressure-rollers.

5. In a skiving machine of the character described, a horizontally disposed knife blade, a feed roller in a plane below the blade and adjacent the cutting edge thereof, means for rotating the roller to feed the work against the cutting edge of the blade, a pressure bar directly over the feeding roller, separately movable plungers guided on the bar and each spring-pressed toward the feeding roller and pressure rollers carried by said plungers for pressing the work against the roller.

6. In a cutting machine of the character described the combination of a rotating shaft journaled in the machine, a driving wheel having a curved contour fastened to the shaft to support a material to be cut into laminations, a plurality of plungers slidably supported in the machine, a presser wheel journaled to each plunger, said presser wheels adapted to bear on a piece of material supported on the driving wheel, a knife in the machine and means to simultaneously move the knife and the driving wheel.

In witness whereof I have hereunto set my hand this 30th day of March, 1927.

FRANK LA VERNE WILBUR.